Dec. 16, 1947. J. H. HOERN 2,432,761
METHOD OF ELECTRIC RESISTANCE WELDING HEAD
CLOSURES TO HOLLOW VALVE BODIES
Original Filed Jan. 17, 1944
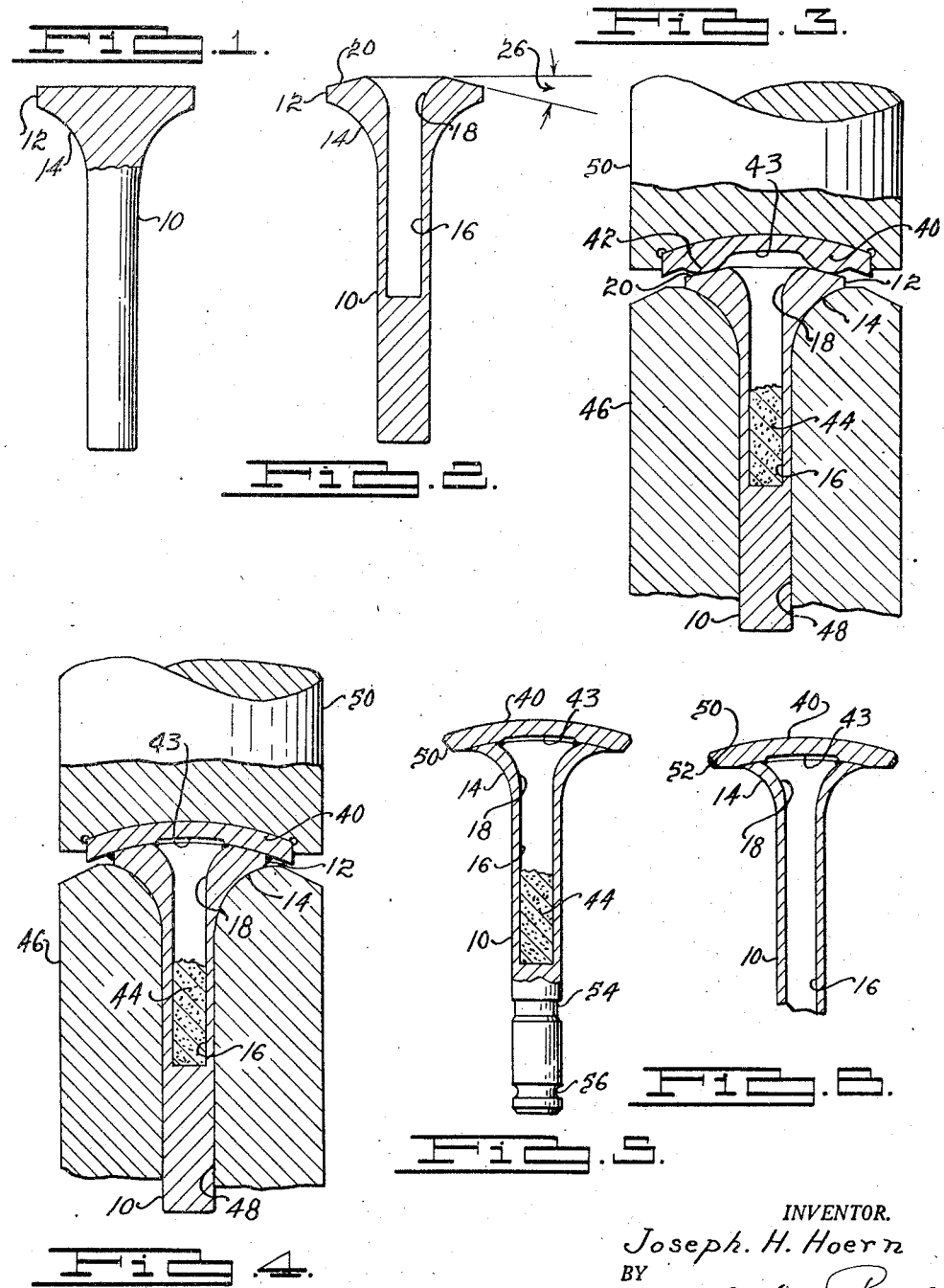
INVENTOR.
Joseph. H. Hoern
BY
ATTORNEYS.

Patented Dec. 16, 1947

2,432,761

UNITED STATES PATENT OFFICE 2,432,761

METHOD OF ELECTRIC RESISTANCE WELDING HEAD CLOSURES TO HOLLOW VALVE BODIES

Joseph H. Hoern, Birmingham, Mich., assignor to Eaton Manufacturing Company, Cleveland, Ohio, a corporation of Ohio Original application January 17, 1944, Serial No. 518,540. Divided and this application September 12, 1944, Serial No. 553,716

2 Claims. (Cl. 219—10)

This invention relates to an improved and more economical method of making valves, particularly of the sodium cooled type, and is a division of my application for Letters Patent of the United States for improvements in Valve and method of making, filed January 17, 1944, and serially numbered 518,540.

Objects of the invention include the provision of a method of making hollow sodium cooled valves for use in internal combustion engines or the like in which the interior surfaces of the valve may be formed and finished in a quick and accurate manner; the provision of a method of making a valve of the character described by means of which such valve may be produced at a much lower cost than is possible by conventional production practices and yet by means of which a satisfactory valve may be obtained; the provision of a method of making a valve of the type described in which all parts of the valve except the upper wall of the head and the seating surface portions thereof are formed from a single piece of metal in which all of the cavities of the completed valve are included, and in which cavities the desired charge of sodium is placed, after which a disc-like closure member is placed over the open end of the same and secured and seated by electrical resistance welding thereto; the provision of a method of making a valve as above described in which the stem or body portion of the valve and the separately formed closure portion thereof are especially formed to facilitate the welding operation therebetween; the provision of a construction as above described in which a rib is provided between the stem or body and the cover portion of the valve for facilitating the welding operation between them; the provision of a method of making a valve as above described in which the rib or projection on one of the two parts of the valve is so formed and located as to minimize the formation of flash within the hollow interior of the completed valve; and the provision of a method of making a valve of the type described that is simple and economical to employ and that results in a cheaper and more efficient valve structure.

The above being among the objects of the present invention the same consists in certain novel steps of operation in the manufacture of such valves to be hereinafter described with reference to the accompanying drawings, and then claimed, having the above and other objects in view.

In the accompanying drawing which illustrates a suitable embodiment of the valve of the present invention and various steps of operation in the manufacture of the same, Figs. 1 and 2 are longitudinal sectional views taken axially through a blank for the body or stem portion of the valve in question showing the same in successive stages of operation;

Fig. 3 is a fragmentary, partially broken, partially sectioned view illustrating the stem portion of Fig. 2 provided with a charge of sodium and a cap or closure member associated therewith in the position assumed at the moment of initiation of a welding operation between them, such parts being shown in operative position between a pair of electrodes;

Fig. 4 is a view similar to Fig. 3 but illustrating the relation of the parts upon the completion of a welding operation therebetween;

Fig. 5 is a partially broken, partially sectioned view of a completed valve formed as a result of the operations illustrated in the preceding views; and Fig. 6 is a fragmentary, sectional view illustrating a modification of the construction shown in Fig. 5.

Conventional practice in the method of making sodium cooled valves consists in first forming a more or less cup-shaped blank from a single piece of metal, and then by a series of successive operations swaging or otherwise reducing the diameter of the open end portion of the blank so as to produce a stem connected to a hollow enlarged head, the stem then being drilled out in most cases to provide it with a predetermined size bore, then rough machining the blank to approximately the size desired in the final product, then charging the bore with sodium through the stem end thereof, and then plugging such open end of the stem, after which the valve may be finish machined. Present day specifications require that the internal dimensions of the head of such valves be maintained within certain limits, that the interior surfaces of the valve be of a predetermined shape and size and of relatively high finish, and that the wall thicknesses be relatively closely controlled between relatively narrow limits. Because of the numerous and exacting steps required to produce a valve meeting present day specifications the cost of such valves is relatively high and a relatively great amount of scrap results in the manufacture of the same due to inability to meet the various requirements. Additionally, and in view of the fact that the valve is formed from one piece of metal and necessarily of a type of metal that may be readily worked during the manufacture of the same, it is impossible to form these valves by conventional methods of such materials as would be of greatest advantage from the standpoint of length of life. This condition is corrected to some extent by welding a different type of metal having more advantageous characteristics from a valve seating standpoint around the periphery of the head of the valve and thereafter machining it to form the valve seating surface therefor, but it will be appreciated that this operation while desirable from an operating standpoint involves added time and expense.

The principal object of the present invention is to provide a method by means of which a sodium cooled valve may be produced in which the principal disadvantages of the conventional type of sodium cooled valve is eliminated. In other words it is the principal object of the present invention to provide a method of producing a sodium cooled valve in which the various portions of the valve may be formed from material more advantageous therefor from an operating characteristic or standpoint and to such a method by the practice of which a valve may be economically, quickly and accurately manufactured, thereby providing a valve of this type that may be advantageously used in fields where the present cost of such valves renders their use commercially impractical.

The first step in forming the valve is to form a stem member or blank of the general external shape illustrated in Fig. 1. The member there shown comprises a cylindrical stem portion 10 having an enlarged head portion 12 at one end thereof, the head portion 12 being connected to the stem portion 10 by a relatively large fillet or radius portion 14.

The blank or stem portion thus described is preferably formed of a suitable steel that will resist warping under the high temperatures met with in service caused by hot exhaust gases flowing therearound. It is preferably resistant to the corrosive and erosive effects of such exhaust gases and is preferably of a character which will resist wear over its area of contact with the usual valve guide (not shown) associated therewith in service and in which it is guided in its reciprocable movements. Particularly where the valve is to be used in large radial engines such as now found in the latest airplanes, a type of steel of a character similar to that commercially known as Silicrome X-142 is preferably employed. Such Silicrome X-142 steel is of the following composition.

| | |
|---|---|
| Carbon | .40– .50 |
| Silicon | .30– .80 |
| Manganese max | .70 |
| Chromium | 13.00–15.00 |
| Nickel | 13.00–15.00 |
| Tungsten | 1.75– 3.00 |
| Phosphorus max | .03 |
| Sulphur max | .03 |
| Molybdenum | .20– .50 |
| Iron, balance. | |

Steel commercially known as 2112 and having approximately the following analysis, may be employed in place of Silicrome X-142 steel above described in high performance engines.

| | |
|---|---|
| Carbon | .15– .25 |
| Silicon | .75– 1.25 |
| Chromium | 20.50–22.00 |
| Nickel | 10.50–12.50 |
| Manganese | 1.25– 1.75 |
| Iron with usual impurities, balance. | |

Where the valves are not to be employed in engines of the high performance characteristics now found in the latest airplane engines, as for instance, valves that are to be employed in motor vehicles or the like, a steel of the following analysis commercially known as C-F-34, or a steel having similar characteristics, may be employed in place thereof.

| | |
|---|---|
| Carbon | .35 – .45 |
| Silicon | .390– .420 |
| Chromium | 2.80 –3.00 |
| Manganese | 2.00 –5.00 |
| Iron with usual impurities, balance. | |

The stem member thus described may be formed in any suitable way that is, for instance, it may be forged to the shape described, but preferably it is formed by taking a blank in the shape of a rod slightly larger in diameter than the stem portion 10 and upsetting one end thereof to form the head 12, or it may be formed in any other suitable manner.

After the stem member has thus been formed as described it is then operated upon as shown in Fig. 2 to form a concentric blind bore 16 therein opening axially onto the head 12 and extending downwardly into the stem 10 for the desired length and which ordinarily will be in excess of half of the length of the stem 10 as illustrated in Fig. 1. This hole may be formed in any suitable manner but will ordinarily be formed by a drilling operation preferably followed by a reaming operation and then preferably followed by a honing and/or polishing operation so as to bring the walls of the bore to a high degree of smoothness and finish. This is for the purpose of eliminating any scratches or grooves which might initiate a fracture of the metal of the valve under the severe forces to which it may be subjected to in service.

The next operation which is also illustrated in Fig. 2 is to flare outwardly the axially outer end of the bore 16 to form a flared throat portion 18. Inasmuch as it is the flared throat portion 18 which will form the hollow interior of the valve head in the completed product it is formed to accurately conform to the size, shape and contour of the corresponding portions of the hollow head in the final product and ordinarily its outer end will be of a diameter materially exceeding the diameter of the stem 10 itself. The throat portion 12 is merged into the walls of the bore 16 in a smooth and unbroken curve and its walls are preferably brought to a high degree of finish and smoothness as by reaming, polishing and the like.

Another operation brought out in Fig. 2, and which may be performed either before or after forming the bore 16 and throat 18, consists in machining the outer axial end face of the head 12 in a specific manner in accordance with the present invention. This operation consists in machining the outer axial end face of the head 12 so that it is beveled axially downwardly away from the axis of the blank so as to form an approximately frusto-conical surface 20. The term "approximately" is used here to indicate that the surface 20 does not need to be truly frusto-conical as in fact it is preferably slightly curved in sectional view. The approximate or mean angularity of the beveled face 20 with respect to a plane perpendicular to the axis of the blank is illustrated at 26.

In order to close the open head end of the stem member a separately formed cap or cover member 40 is provided and which is shown in its initial form in Fig. 3. As there shown it comprises a disc preferably of materially greater diameter than the head end of the stem member and of suitable thickness. Where a domed head valve is desired, then the cap member 40 is preferably formed on its outer surface at least to conform to a part of a surface of a sphere as shown. In accordance with the present invention the lower face of the disc 40 has formed thereon a circular rib 42 concentric therewith and preferably, but not necessarily, of partially circular cross-sectional conformation as illustrated in Fig. 3. Also as illustrated in Fig. 3 the mean diameter of the rib 42 is preferably slightly greater than the mean diameter of the axial end face 20 of the stem member and it is applied concentrically to the stem member illustrated in Fig. 3 with the bead 42 thereof in contact with the surface 20. Preferably, and as will be appreciated from an inspection of the various figures of the drawing, the lower face of the disc 40 within the area bounded by the rib 42 is cut away as at 43 so that the thickness of the disc within the area encompassed by the rib 42 is less than that of the remainder of the disc. The edges of this cut away portion blend into the rib 42 so as to more or less blend into the throat 18 of the stem portion in the final product.

The disc 40 and the stem member are then welded together as will hereinafter be explained in greater detail but it will be understood that before the disc 40 is welded to the stem member a suitable charge of sodium indicated at 44 is introduced into the bore 16 of the stem 10 and those spaces of the bore of the stem member not filled with the sodium 44 are preferably flooded with nitrogen or other suitable inert gas so as to eliminate as far as possible the presence of oxygen in the completed valve, and which oxygen might act to oxidize both the valve and the sodium if present.

In welding the disc 40 to the stem member, the stem member is placed in an electrode such as 46 illustrated in Figs. 3 and 4 and which is provided with a bore 48 formed for complementary reception of the stem 10 and flared portion 14 of the stem member, the major portion of the head 12 projecting above the upper surface of the electrode 46 as shown. The disc 40 is pressed by a second electrode 50 downwardly into contact with the valve blank and is maintained in concentric relation with respect to the valve blank thereby. In actual practice a relatively great force is exerted tending to move the electrodes 46 and 50 toward one another and while this force is being exerted an electric current of high amperage is caused to flow between them, this electric current causing the materials of the disc 40 and stem member at the area of contact between them to be fused and to be intimately intermixed with one another, the pressure between the electrodes being maintained until the entire upper axial end face of the stem member has been fused to the lower face of the disc 40, upon which the flow of electric current is discontinued, a sufficient time permitted for solidification of the fused metal upon which the electrodes are separated and the valve blank in its thus far completed condition removed, the valve blank under such circumstances having reached a stage of completion illustrated in Fig. 4. It will be noted that in this operation the rib 42 is substantially completely melted away and fused into the corresponding metal melted on the stem portion, but not melted away to such an extent as to bring the surface of the portion 43 into flush relation with respect to the upper face of the stem portion. By this means the central portion of the head of the valve is thinned and a larger space provided in the head of the valve for the sodium.

In explaining the reason for providing the rib 42 on the disc 40 in accordance with the present invention the following explanation may be given, it being understood that in the broader aspects of the invention it may be formed either on the disc 40 or on the surface 20 of the stem member. It has been found commercially impractical to attempt to provide the valve blank and the disc with flat contacting faces and to effect a resistance weld between them because of an impractically high amount of electric current required in such case and particularly with larger sizes of valves such as are employed in the larger airplane engines today. Furthermore, where it is attempted to employ such flat contacting faces it is substantially impossible to accurately control the flow of the molten metal during the welding operation.

It has been found that by providing the rib 42 on the valve blank or the disc the weld is initiated over a relatively small area in which the resistance to the flow of electric current quickly builds up to the heat of fusion of the metals and it aids to localize the area of fusion of the metals to substantially only that area required in the welding operation. As a result it will be appreciated that the use of the ribs on the blank body or disc permits a smaller electrical current to be employed for successfully carrying out the operation than would otherwise be possible and at the same time it limits the fusion of the metals of the two parts to substantially only that area thereof required for a proper weld.

The direction of flow of the flash resulting in the welding operation is controlled in accordance with the present invention by arranging the rib 42 closer to the radially outer edge of the upper end face 20 of the stem member than to the radially inner edge thereof. Due to this arrangement of the rib 42 the initial fusion of the metals of the two parts occurs radially outwardly of the mean diameter of the area of contact of the two parts in the final product. Due to the fact that during a weld the fusion of the metal is necessarily initiated along the line of contact between the two parts to be welded together and the fusion then spreads radially at an equal rate, it will be appreciated that the radially outer portion of the axial end face of the valve body blank will become molten more quickly than the radially inner edge portion thereof, with the result that the flow of molten metal occasioned by the pressure exerted by the electrodes 46 and 50 toward one another will tend to be in a radially outward direction rather than radially inwardly as it is along such path of flow that the less resistance is met with to such flow. The beveling of the axially outer free end of the head 12 aids in producing this effect. As a result of this arrangement it has been found possible to project substantially all of the flash from the weld in a radially outward direction and to substantially eliminate any unwarranted amounts of flash on the interior of the valve.

The outer open end face of the body being outwardly and downwardly beveled, when this is pressed against the rib of the head plate, the conical end portion of the body will naturally tend to spread the ring radially outwardly. The same action will, of course, result as occurs when a center punch is driven into a hole in a piece of metal. Under such circumstances, there is no tendency for the metal to flow radially inwardly, the whole tendency being to force the metal radially outwardly. This same action occurs in the welding of the head to the body in the valve of the present invention, and for this reason when the rib is softened by the flow of electrical energy between the head and the body and axial pressure is simultaneously applied between these parts, there is a natural tendency to force the material of the rib radially outwardly. For this reason, the bulk of the flash will be forced radially outwardly. Because of the speed of the operation and the practical impossibility of discontinuing the electric current of the welding operation at exactly the desired moment during repeated operations, a slight amount of flash may be forced inwardly and if the rib is slightly larger than the mean diameter of the conical end of the body, there will be less likelihood of flash flowing inwardly than if the rib is exactly the mean diameter or smaller.

In the broader aspects of the invention the disc 40 may be made from the same material as the main body portion of the valve blank or it may be made of a different material. However, in accordance with a more limited phase of the present invention the disc 40 is made of either of two specific types of metal which are sold commercially under different trade names. These alloys are of substantially the following respective analyses.

*First alloy*

| | |
|---|---|
| Carbon | .15– .30 |
| Silicon max | .30 |
| Manganese | .60– 1.00 |
| Chrome | 19.00–21.00 |
| Sulphur max | .03 |
| Iron max | 1.00 |

Nickel, balance.

*Second alloy*

| | Per cent |
|---|---|
| Chromium | 25–31 |
| Tungsten | 3– 6 |
| Cobalt min | 55 |
| Other elements max | 7.5 |

The reason for using these alloys is that in modern high performance internal combustion engines which employ a lead doped fuel it has been found that the lead in the fuel seriously attacks the usual metals from which such valves are made. It has been found that the first alloy above disclosed is particularly resistant to the effects of such leaded fuel and, therefore, offers an ideal material for forming the valve head and seat in such cases. An alloy of the second analysis above given is also very resistant to the effects of leaded fuels and is, therefore, also desirable for use as the valve heads and seats of such valves. It is not as resistant as the first alloy to the effects of such leaded fuel but on the other hand is harder and, therefore, will stand up longer than the first alloy under the pounding which the valve ordinarily receives against the cooperating valve seat. For these reasons it is sometimes desirable, where such pounding of the valve upon its seat is liable to occur, to form the disc 40 from the first alloy and after machining it to the desired size, shape and contour, to weld or otherwise apply a coating of the second alloy of the above identified analysis to the valve seating surface of the valve head to overcome deficiencies of the first alloy in the above described respect. In any event upon completion of the welding steps between the valve body blank and the disc 40, the assembly reaches the stage illustrated in Fig. 4 wherein the disc 40 is securely welded to the valve body blank and the assembly, therefore, becomes an integral one-piece structure. This assembly is then machined to form the completed valve such as illustrated in Fig. 5 from which it will be noted that the fillet portion 14 of the valve body blank has been machined away so as to merge into a smooth gradual curve into the disc portion 40 and the peripheral portion of the disc portion 40 has been machined to provide an angular valve seating surface 50 for cooperation with the usual valve seat. The opposite end of the valve stem 10 has been provided with grooves 54 and 56 for cooperative reception of the conventional type of valve spring retainer washer (not shown). It will also be appreciated that the central portion of the top wall of the valve is thinner over the area 43 than outwardly therefrom, thus giving the valve ample strength to back up the forces acting on the seating surface 50 without an unduly heavy top wall.

As is mentioned above in some cases where the disc portion 40 is formed from the first alloy above identified and the valve is liable to pound against its seat in operation, then as previously mentioned it may be desirable and as illustrated in Fig. 6 to weld a layer 52 of the second alloy of the composition above given to the valve seating surface 50 of the disc portion 40, thus not only getting the superior characteristics of the Brightray material for the head surface of the valve but also getting the superior characteristics of the second alloy, particularly with relation to hardness, for the valve seating portion of the valve.

It has been found that valves produced in accordance with the present invention may be manufactured for a fraction of the cost of sodium cooled valves manufactured in accordance with present day practices and at the same time, particularly where the first alloy or the second alloy disc portions 40 are employed, provides a valve of superior characteristics to valves produced in accordance with conventional practice.

Having thus described my invention, what I claim by Letters Patent is:

1. In the manufacture of a poppet valve of the liquid cooled type of the class wherein there is a main body portion of weldable metal consisting of a cylindrical stem portion and a concentric outwardly flared end portion, which main body portion is provided with a blind hole extending into the stem portion and opening onto said flared end portion in flared condition, and a disc of weldable metal of a diameter at least as great as the maximum diameter of said flared end portion is secured by welding to the main body portion in closing relation to said opening therein, the steps of beveling the axially outer face of said flared end portion of said main body portion with respect to a plane perpendicular to the axis of said main body portion in a radially outwardly and axially rearwardly direction to form a smooth and substantially unbroken end face therefor, forming a concentric rib on said disc of approximately the mean diameter of said axially outer face of said main body portion, pressing said disc concentrically and axially against said free end face with said rib and free end face in contact with each other and forming the sole line of contact therebetween and simultaneously passing an electric current of sufficient strength between said disc and said main body portion to cause the materials at the point of contact between them to become fused, and the beveled end portion of the main body to cause the bulk of the resulting flash to flow radially outwardly, and then discontinuing the flow of said electric current.

2. In the manufacture of a poppet valve of the liquid cooled type of the class wherein there is a main body portion of weldable metal consisting of a cylindrical stem portion and a concentric outwardly flared end portion, which main body portion is provided with a blind hole extending into the stem portion and opening onto said flared end portion in flared condition, and a disc of weldable metal of a diameter at least as great as the maximum diameter of said flared end portion is secured by welding to the main body portion in closing relation to said opening therein, the steps of beveling the axially outer face of said flared end portion of said main body portion with respect to a plane perpendicular to the axis of said main body portion in a radially outwardly and axially rearwardly direction to form a smooth and substantially unbroken end face therefor, forming a concentric rib on said disc of a diameter slightly greater than the mean diameter of said axially outer face of said main body portion, pressing said disc concentrically and axially against said free end face with said rib and free end face in contact with each other and forming the sole line of contact therebetween and simultaneously passing an electric current of sufficient strength between said disc and said main body portion to cause the materials at the point of contact between them to become fused, and the beveled end portion of the main body to cause the bulk of the resulting flash to flow radially outwardly, and then discontinuing the flow of said electric current.

JOSEPH H. HOERN.

REFERENCES CITED

The following references are of record in the file of this patent:

UNITED STATES PATENTS

| Number | Name | Date |
|---|---|---|
| 1,294,416 | Dady | Feb. 18, 1919 |
| 1,359,075 | Kraft | Nov. 16, 1920 |
| 1,714,690 | Nevins | May 28, 1929 |
| 1,824,323 | Boyle | Sept. 22, 1931 |
| 2,086,985 | Mitchell | July 13, 1937 |
| 2,131,953 | Jardine | Oct. 4, 1938 |
| 2,194,272 | Blu | Mar. 19, 1940 |
| 2,218,983 | Daisley | Oct. 22, 1940 |
| 2,314,105 | Rose | Mar. 16, 1943 |
| 2,354,947 | Colwell | Aug. 1, 1940 |
| 2,373,459 | Colwell | Apr. 10, 1945 |

FOREIGN PATENTS

| Number | Country | Date |
|---|---|---|
| 5,721 | Great Britain | 1915 |
| 803,927 | France | July 20, 1936 |